(12) United States Patent
Rankin (10) Patent No.: US 8,442,358 B2
(45) Date of Patent: May 14, 2013

(54) PRESENTATION AND MANIPULATION OF HIGH DEPTH IMAGES IN LOW DEPTH IMAGE DISPLAY SYSTEMS

(76) Inventor: Steven Andrew Rankin, Waterloo (CA)

( * ) Notice: Subject to any disclaimer, the term of this patent is extended or adjusted under 35 U.S.C. 154(b) by 394 days.

(21) Appl. No.: 12/787,975

(22) Filed: May 26, 2010

(65) Prior Publication Data

US 2010/0303327 A1  Dec. 2, 2010

Related U.S. Application Data

(60) Provisional application No. 61/182,449, filed on May 29, 2009.

(51) Int. Cl.
G06K 9/00 (2006.01)
G06K 9/32 (2006.01)

(52) U.S. Cl.
USPC ............ 382/298; 382/299; 382/128; 382/162

(58) Field of Classification Search .......... 382/298–299, 382/128, 162
See application file for complete search history.

(56) References Cited

U.S. PATENT DOCUMENTS

| | | | | |
|---|---|---|---|---|
| 5,715,823 | A * | 2/1998 | Wood et al. | 600/437 |
| 6,934,698 | B2 | 8/2005 | Judd et al. | |
| 7,668,835 | B2 * | 2/2010 | Judd et al. | 707/803 |
| 8,055,636 | B2 * | 11/2011 | Judd et al. | 707/705 |
| 8,140,708 | B2 * | 3/2012 | Zaharia et al. | 709/246 |
| 8,244,014 | B2 * | 8/2012 | Reicher et al. | 382/128 |
| 2002/0091659 | A1 * | 7/2002 | Beaulieu et al. | 706/62 |
| 2005/0270288 | A1 | 12/2005 | Arcas | |
| 2006/0023967 | A1 * | 2/2006 | Hayashi et al. | 382/276 |
| 2009/0096807 | A1 | 4/2009 | Silverstein et al. | |
| 2012/0130226 | A1 * | 5/2012 | Huizenga et al. | 600/411 |

FOREIGN PATENT DOCUMENTS

WO  2006008681 A1  1/2006

OTHER PUBLICATIONS

Gillespy, Thurman, "Optimized algorithms for displaying 16-bit gray scale images on 8-bit computer graphic systems," Journal of Digital Imaging, Feb. 1, 1993.*
International Search Report issued by the Canadian Intellectual Property Office dated Sep. 9, 2010 for corresponding International Application No. PCT/CA2010/000791.
Written Opinion of the International Searching Authority issued by the Canadian Intellectual Property Office dated Sep. 9, 2010 for corresponding International Application No. PCT/CA2010/000791.
J4care Website, "PatientViewer: 100% network centered, east to use and secure", (http://www.j4care.com/Products/J4Care%20Viewer), J4Care, GmbH, Nov. 2008.

* cited by examiner

Primary Examiner — Bhavesh Mehta
Assistant Examiner — Utpal Shah
(74) Attorney, Agent, or Firm — Lorelei Graham (57) ABSTRACT

High depth grayscale images, (e.g. <8 bits per pixel) are losslessly cross channel encoded to multi-channel image formats for transformation and display by display devices not capable of displaying high depth grayscale. DICOM and other images may be encoded and provided to web browser based client image viewers that leverage native code for handling multi-channel images. Transformations are applied to reconstitute the high depth grayscale images.

26 Claims, 7 Drawing Sheets

Fig. 4
Basic Web Browser Workflow - Script Support

Fig. 5
Basic Web Browser Workflow - Color Matrix Transform Support

Fig. 6
Basic Web Browser
Workflow - Limited
Scripting Support

Fig. 7A          Fig. 7B          Fig. 7C

PRESENTATION AND MANIPULATION OF HIGH DEPTH IMAGES IN LOW DEPTH IMAGE DISPLAY SYSTEMS

CROSS REFERENCE

This application claims the benefit of U.S. Provisional Application No. 61/182,449, filed May 29, 2009 and which is incorporated herein by reference.

FIELD

The present relates generally to the presentation of images and more particularly to the presentation and manipulation of high depth images in low depth image display systems.

DESCRIPTION OF THE RELATED ART

Overview—the Need—Access to Medical Images

Diagnostic imaging is an important part of a patient's care and a key driver of quality care in many scenarios. Unfortunately, access to a patient's images continues to be limited for many health professionals.

In the past, film was the primary means of distribution. However, the costs associated with printing and distributing film prohibited its delivery; leaving health professionals with limited access to medical images. In many cases, however, access to both the report and medical images is required for optimal care and in these circumstances, through an explicit request, films would be made available to the caregiver. This process resulted in delays and inefficiencies that impacted the quality of care.

Today, digital imaging is common and offers the potential for a more efficient means of image distribution. Unfortunately, there are some specific operational and technical barriers that health professionals, and the vendors who serve them, are unable to surmount. For example, for many forms of digital imaging, faithfully capturing a subject's dynamic range is essential. In medicine many imaging modalities are capable of generating medical images containing thousands of distinct grayscale levels (i.e. shades of gray, black and white) to deliver diagnostic quality images. These images are often stored in the format specified in the Digital Imaging and Communication in Medicine (DICOM) standard. DICOM leverages several industry image standards and allows, in its specification, images to store greater than 8 (Bits Per Pixel) BPP of precision, including 12 and 16 BPP. 12 and 16 BPP images are common in medicine and, for many imaging procedures, offer greater diagnostic quality than 8 BPP. For example, MRI images often contain 16 BPP allowing the images to have up to 65,535 shades of gray. In contrast, an 8 BPP image only contains a maximum of 255 shades of gray. The ability to capture, view and manipulate the full dynamic range of greater than 8 BPP medical images is critical towards supporting an accurate diagnosis of a patient's disease or injury.

Overview—the Problem—Limited Access to High Quality Medical Images

Greater than 8 BPP (e.g. 12 BPP and 16 BPP) medical images are capable of storing a much wider dynamic range of visual information than can be displayed on a common consumer PC, video monitor and video hardware. Most consumer display devices were created to match the gamut of the image file BPP range commonly available, or soon to be available, at the time of the release of the display devices. Consequently, most PC's only support up to 24 BPP color and 8 BPP grayscale image and are not capable of loading, presenting and manipulating greater than 8 BPP images (e.g. 12 BPP and 16 BPP grayscale images). Others have proposed to resolved this by:

- compressing the 16 BPP data from a user defined display range (the "window") to 8 BPP (256 shades of gray),
- installing proprietary software and/or hardware capable of loading, displaying and manipulating greater than 8 BPP grayscale images, or
- loading greater than 8 BPP grayscale images (e.g. 16 BPP) on a server and, through propriety software, creating 8 BPP grayscale image(s) from 16 BPP grayscale image(s) and sending the image(s) to the client.

Various drawbacks may be associated with these solutions:

- The process of down-sampling a 16 BPP image to an 8 BPP image introduces loss and removes critical diagnostic information which is an unacceptable solution;
- Installing proprietary software is also not an option due to licensing costs, maintenance costs and/or the hospital IT's restricted management of desktops; and
- Sending 8 BPP images, created from 12 BPP, 16 BPP, etc. source images, from a server to a host display device in response to every user action (e.g. zoom, pan, window and level, etc.) is bandwidth intensive, slow, and ends in a frustrating user experience.

SUMMARY

Overview—the Solution—Access to DICOM Images Leveraging the Existing Software on Common Host Display Devices In one aspect, the present relates to presentation and manipulation of high depth images in low depth image display systems such as an enterprise image management, display and manipulation system.

The high depth images may comprise DICOM images. The high depth images may be encoded by a server and provided to client display devices. Client display devices may execute a client viewer within a web browser to request desired high depth images for displaying.

In one aspect there is provided a method for encoding first images to second images comprising fewer Bits Per Pixel (BPP) per channel than said first images. The method comprises dividing losslessly first BPP data of a channel from a first image among two or more channels of a multi-channel image format to define second BPP data of a second image for loading by a display system supporting said format, said first BPP data divided in accordance with a transformation for applying by the display system to display any portion of the first image within the display capability of the display system; and at least one of storing the second image or providing the second image for display by the display system.

In another aspect, there is provided a method for displaying high depth images in a low depth image capable display system. The method comprises receiving a second image in a multi-channel image format supported by said display system and comprising data determined according to lossless cross-channel encoding from a first image having higher Bits Per Pixel (BPP) per channel than said second image; executing native code to decompress said second image in accordance with the supported multi-channel image format; and applying a transformation to said decompressed image in accordance with said cross-channel encoding to define a reconstituted first image to enable the display of any portion of the first image within the display capability of the display system.

In accordance with these aspects, the solution:
- may allow display devices to load, display and manipulate images of a bit depth greater than it supports.
- need not require the installation of software (including Java®) to view the image's full bit depth (for example, images may be viewed in commonly configured commercially available web-browsers or embedded in another application, or file such as PDF.)
- encodes images to hide high BPP image data in standard low BPP image files formats. Although the images are no longer properly displayable, this is a concealed stratagem that is able to leverage a display device's native code base to exploit the speed of its internal code execution to decode the images and return the images to a displayable format; achieving a speed normally only associated with installed proprietary software.

Persons of ordinary skill in the art will recognize various device, method, computer program product and other aspects from the embodiments shown and described.

BRIEF DESCRIPTION OF THE DRAWINGS

Embodiments will now be described by way of example with reference to attached figures wherein.

DETAILED DESCRIPTION

Images stored and transmitted in the Digital Imaging and Communication in Medicine (DICOM) standard cannot be viewed in full-fidelity on consumer grade hardware using standard web browsers. Typically, the images are greater than 8 Bits Per Pixel (BPP): 12 BPP and 16 BPP (high depth) grayscale images are common. Standard web browsers operating with popular operating systems and consumer grade monitors and video cards are only capable of displaying 8 BPP (low depth) grayscale images, leaving users missing critical diagnostic information.

Picture Archive and Communications (PACS) Vendors typically install propriety software and/or hardware to view high depth images while most hospital Information Technology (IT) system administrators often will not allow the installation of propriety software and will often refuse to update any existing software such as Java across their large number of un-managed and managed desktops. And where hospitals or other sites will allow such installation of PACS systems, the cost of licensing and managing the PACS software may be prohibitive. As a result, broad access to medical images within and outside of a hospital's intranet remains largely unavailable.

Enterprise Medical Record (EMR) systems continue to present patient data to the medical enterprise void of medical image data. The absence of broadly distributed medical images within the EMR record continues to be an unmet, high priority issue for care givers and their hospitals.

To surmount these challenges several vendors within the medical domain are leveraging the Digital Imaging and Communications in Medicine (DICOM) standard's Web Access to DICOM Objects (WADO) specification. In part, the DICOM WADO specification specifies how web clients can request 8-bit grayscale images from a server that derives the images from greater than 8 BPP grayscale images. Some vendors go one step further and use AJAX enabled web clients to allow a User to view an image and manipulate that image; for every manipulation request the server generates a new 8-bit image from the greater than 8 BPP image and sends it to the client. This implementation is often inefficient, slow and bandwidth intensive.

In contrast to this approach, U.S. Pat. No. 6,934,698 entitled Medical Image Management System of Heart Imaging Technologies LLC describes creating static 8 BPP grayscale or 24 BPP color images that are the best presentation for the original image—both anatomically, by reducing the BPP down to what the display system supports, cropping the resolution to the anatomy of interest, and by adjusting the Window and Level to the modalities intended presentation.

Within the medical market there is a strong trend that favours accessing medical records through a web-browser without the need to install any software and an equally strong (and reasonable) expectation of great performance from these web applications. For example, a standard measure of performance for medical images is image load time; a 2048 (height)×2048 (width) AP Chest X-Ray, should take 2 second to display, offer panning and zooming transformations at 20 frames per second and Window and Level transformations of greater than 7 fps on a P4 laptop with 2 GB of RAM.

Figure 1:
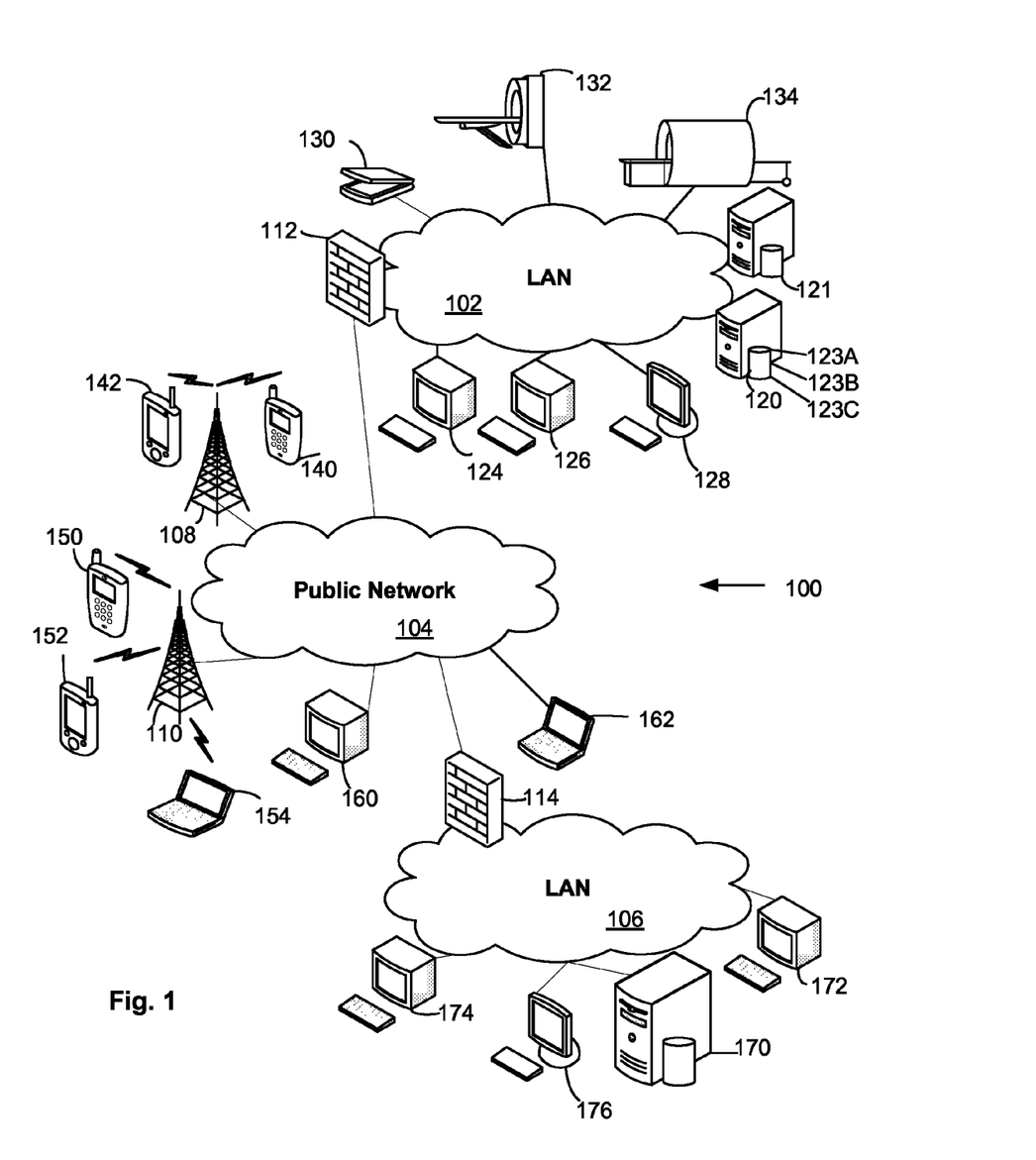
FIG. 1 is a block diagram illustrating components of a network topology for acquiring, storing, manipulating, distributing and presenting medical images in accordance with an embodiment.

FIG. 1 is a block diagram of a network topology for a communication system 100 in accordance with a representative embodiment in which an embodiment of an enterprise image management, display and manipulation system may be configured to present high depth images in low bit depth capable image display systems. In the present embodiment, system 100 comprises respective private networks ((i.e. local area networks (LANs)) 102 and 106 coupled for communication via public network 104. Private networks 102 and 106 are coupled to public network 104 via various network infrastructure such as but not limited too respective firewalls 112 and 114. Other infrastructure is not shown. Private network 104 is coupled to one or more wireless networks represented by towers 108 and 110. Such networks may comprise private and or public access networks such as cellular carriers, Wi-MAX, etc.

Private network 102 may comprise a hospital or clinic enterprise network. A plurality of image acquisition systems or devices 130, 132, 134, in accordance with one or more modalities, may be coupled to the network 102. Such may comprise image scanners, computerized tomography (CT) scanners, magnetic resonance imaging (MRI) scanners, etc.

Images (e.g. 123A, 123B, 123C, (collectively 123)), in particular high depth images, and other data acquired from or in association with these modalities may be stored to a management system 120 such as a PACS system. The images and data may be stored in a standardized format such as DICOM. Typically, such images 123 comprise grayscale images as described above. System 120 may comprise one or more computer servers and storage means providing one or more applications (e.g. software applications) for storing, retrieving and manipulating such images 123 and other patient related data. Management system 120 may be configured to provide such functionality to client display stations and, as in the present embodiment, may be configured to provide an interface for other image related systems, such as enterprise image management, display and manipulation system, to request and receive such images 123.

Client displays stations 124, 126, 128 may be coupled to private network 102 for retrieving and viewing the images and data from the management system 120. In one embodiment at least some of the stations (e.g. 124 and 126) comprise display devices (e.g. hardware and/or software) capable of displaying high depth grayscale images 123 and proprietary software (e.g. a proprietary PACS viewer) for communicating with management system 120 for requesting and receiving the high depth images 123.

Further, one or more client display stations (e.g. 128) may comprise a conventional computer (e.g. PC or MAC) having a monitor, a laptop, a mini-computer (sometimes called a "netbook") or a similar configuration whose hardware and software is not capable of displaying high bit depth grayscale images but only such low depth images such as 8 bit grayscale.

An enterprise image management, display and manipulation system 121 may be coupled to the private network 102. System 121 may comprise hardware (such as one or more servers and storage means) and software applications, including one or more components in accordance with an aspect of the present invention. System 121 is configured to communicate encoded images (such as those obtained from high BPP images 123 from system 120) to client display stations (e.g. 128) in manner that permits these stations to display the received encoded images within their reduced capabilities yet providing users with an enhanced experience of higher BPP display precision. System 121 may be configured to store high BPP images locally and/or communicate with an external management system, such as 120, for images, whether such external system is closely or remotely located to system 121. Though shown separately, aspects of system 121 may be configured within a system such as system 120 or co-hosted on a same server environment as a system such as system 120.

Though described as communicating images to client display stations that are not capable of displaying high depth images, system 121 is not restricted from communicating with stations that may be capable of displaying high depth images (e.g. 124). As described below, system 121 may be configured to communicate encoded images with client stations that are not coupled within private network 102 but which may be accessing system 121 such as via permitted access through firewall 112.

In one embodiment private network 106 is a small office network such as a medical office. In another it is a home office. In yet another it is a hospital network, for example, a hospital that may not comprise a PACs or similar management system. Network 106 may couple one or more display systems 172, 174, 176 and a server 170 for communications with one another and/or the other networks 102 and 104. In one embodiment, client display stations 172, 174, 176 comprise conventional computers and monitors, laptops, mini-computers or the like that are capable of displaying grayscale images that are low depth images only. That is, like display station 128, stations 172-176 cannot display grayscale images in high bit depths. In one embodiment, server 170 may be configured to provide enterprise image management, display and manipulation system. Such as system may store high BPP images locally and/or communicate with another system for same whether such other system is coupled locally (not shown) or remotely (e.g. system 120).

Public network may be coupled to one or more display stations (e.g. 160) comprising conventional computers with monitors, laptops, mini-computers or the like that are capable of displaying grayscale images that are only low depth images. That is, like display station 128, station 160 cannot display grayscale images in high bit depths. Station 160 may represent a home computer coupled via DSL or other technology to public network 104. Station 160 may be configured to communicate with an enterprise image management, display and manipulation system (e.g. 121 or 170). Station 160 may be configured to communicate via Virtual Private Network (VPN) or other secure communications.

Wireless networks 108 and 110 may be coupled to wireless communication devices 140 and 142, and 150, 152 and 154. Such devices may include smartphones, PDAs, laptops, etc. Similarly, devices 140 and 142, and 150, 152 and 154 are not capable of displaying high bit depth grayscale images. Such device may be configured to communicate with an enterprise image management, display and manipulation system (e.g. 121 or 170). Such devices may be configured to communicate via Virtual Private Network (VPN) or other secure communications.

In the present embodiment, display systems 128, 160, 172, 174 and 176 and devices 140, 142, 150, 152 and 154 comprise a browser application capable of displaying low bit depth images in grayscale but not high depth images. At least some of such systems and devices comprise native conventional code for processing multi-channel images. At least some are capable of executing scripts (ECMA script or JavaScript®). Some, such as one or more of the wireless devices for example, may not be capable of executing scripts.

In accordance with the operations described herein below, high bit depth grayscale images may be encoded as multi-channel images and presented to at least some of those display stations or wireless devices for transforming and displaying as grayscale images. In accordance with one embodiment, operations may be varied in response to the capabilities of the respective display stations and devices.

Figure 2:
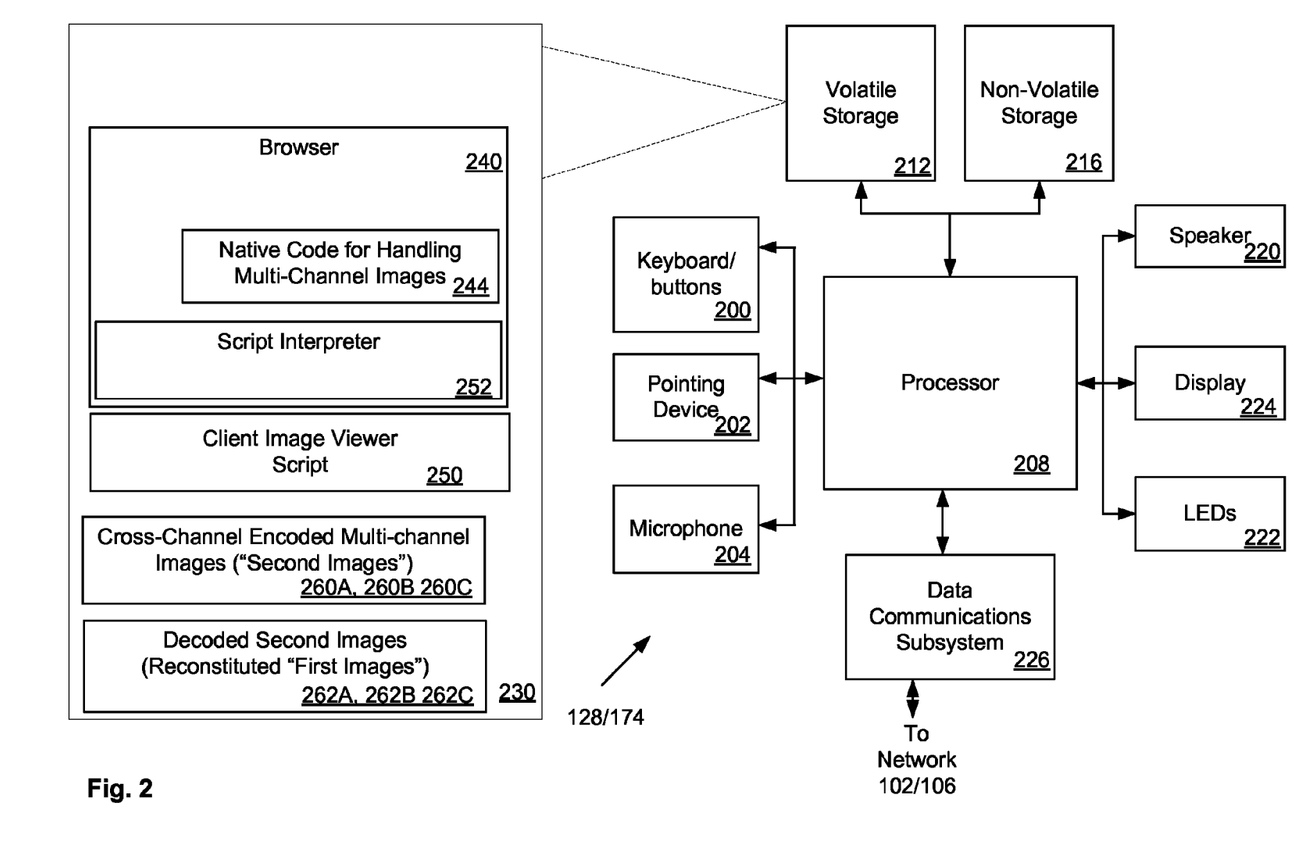
FIG. 2 is a detailed diagram of a user's image presentation system, in accordance with an embodiment, within the network topology of FIG. 1.

FIG. 2 is a block diagram of a representative display station or wireless device such as 128 or 174 (hereinafter system 128/174) showing more detail. In the present embodiment, system 128/174 comprises one or more input and/or output devices, such as keyboards/buttons 200, pointing device 202, microphone 204, speaker 220, display/monitor 224, LEDs 222. The input and/or output device are coupled to a processor 208 as are non-volatile and volatile storage 212 and 216 (e.g. ROM or RAM) which may take various forms. Not shown are other devices for input and/or output such as CD-ROM devices, DVD devices, etc. A data communications subsystem 226 couples system 128/174 for communication to respective network 102 or 106.

Though the processor is shown coupling directly with the various other components, persons or ordinary skill in the art will appreciate that other configurations and components such as various buses and stores, power supply, etc. are not shown. Processor 208 may comprise more than one CPU.

Representative instructions and data 230 (such as may be stored by storage means 212 and/or 216 (as designated by broken lines adjacent thereto)) for configuring the execution of processor 208 comprise a web browser application 240, a client image viewer script 250 and script interpreter 252. Representative instructions and data 230 further comprises cross-channel encoded multi-channel images ("second images") 260A, 260B and 260C, and decoded second images (i.e. re-constituted "first images") 262A, 262B and 262C. Browser application 240 may comprise native code 244 for handling multi-channel image formats. Other instructions that are not shown may include an operating system and other applications, utilities, etc.

Figure 3:
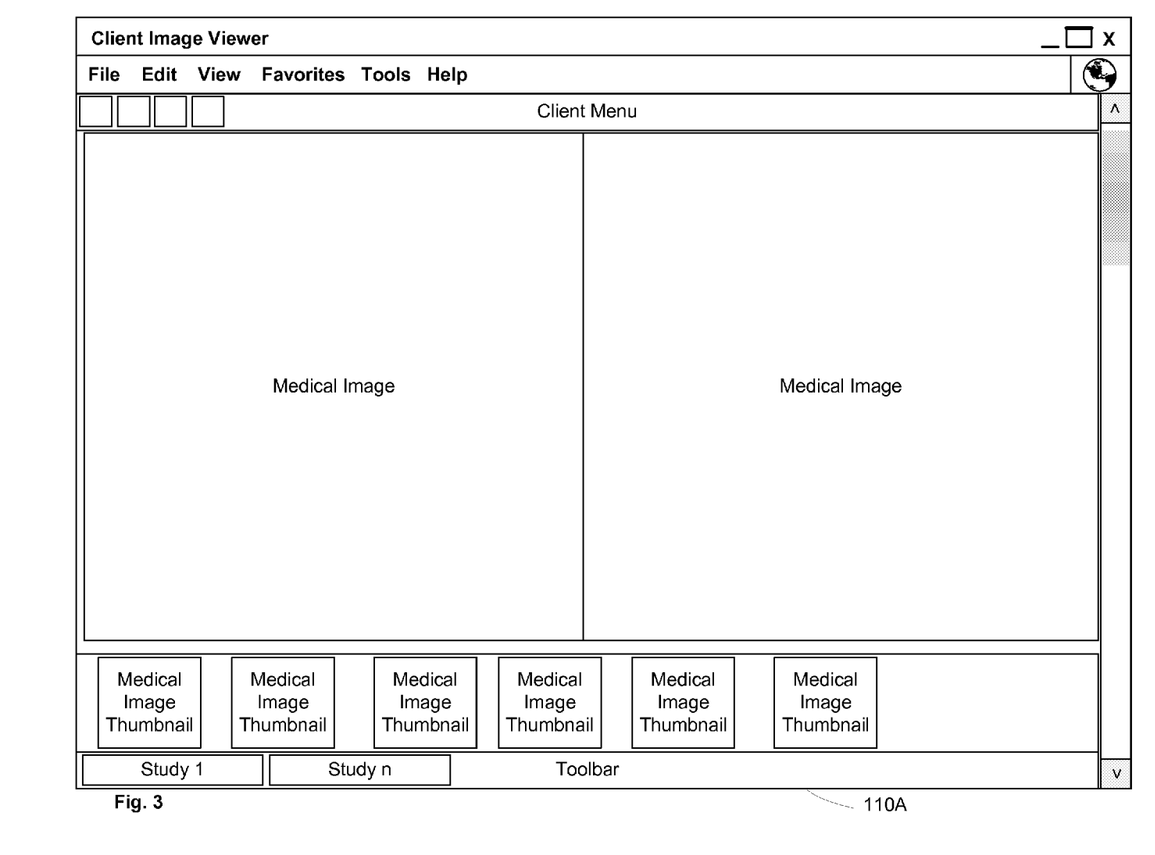
FIG. 3 is a representative screen view of a browser-based image display application in accordance with an embodiment that may be provided by the image presentation system of FIG. 2.

FIG. 3 is a representative view of a user interface of client image viewer script 250. Persons of ordinary skill will appreciate that client image viewer script 250 may be downloaded from server 121/170 each time the application is invoked (e.g. via a URL) within the web-browser 240, thus keeping the script 250 up to date and avoiding a formal installation of client side software.

Cross Channel Imaging Chain—Overview

In accordance with an aspect of the present invention, there is described a manner to enable common consumer devices (e.g. system 128/174) to load, manipulate and display high BPP, diagnostic (i.e. no loss) grayscale images (e.g. images not supported by the device such as 12 and 16 BPP) to a bit-depth and the luminance mapping the display device supports without installing any software.

A real-world example to help frame this description is the use of web-browsers to distribute DICOM images across a hospital's network. Web-browsers only support the display of 8 BPP grayscale images and are the portal of choice for many health professionals, so they are a typical example of a UI within a client display device/station.

The use of a medical related image scenario is not intend to limit the scope of the example. For example the present cross channel method can be used to enable portable media and many host applications to easily load, view and manipulate high BPP grayscale images. The concepts are directly applicable to domains other than medical and, without installing software, include:

The ability to load and display high BPP, lossless grayscale images;

Grayscale images only have one channel. This channel describes a pixel's luminance through a depth that includes 8, 12, 16 BPP. Common consumer display devices (hardware and software), typically, are only capable of displaying an 8 BPP grayscale image. Therefore, if the image is 10, 12 or 16 BPP, specialized software is required to map a selected bit range to the bit-depth (and luminance scale) of the display device so that the user can view and manipulate the image's entire range of visual information. In the medical community this if often referred to as window and level (and commonly mistaken for brightness and contrast).

The ability to manipulate high BPP, lossless grayscale images (i.e. apply window and level (linear and non-linear mappings) to view an image's entire visual range.

Window and Level adjustments (i.e. linear and non-linear mappings) may be fixed, dynamically adjustable, or set by user preference or by a specified image presentation (e.g. DICOM's Grayscale Softcopy Presentation State (GSPS)). By varying the mapping, the Window and Level of an image can be adjusted and different anatomical features within the image may be enhanced or suppressed.

The ability to approach the performance of installable propriety software;

Physician adoption of any web-based image viewing solution may depend on the solution's ability to approach the image display performance of proprietary, installable software. Instead of focusing on server and streaming performance gains, an aspect of the present solution targets and leverages as much of a device's native code to achieve greater performance and speed. A display device's native code is not intended to be used in this manner and has no public application interface. However, by pre-encoding images in a particular way, silent advantage may be taken of the local system's native decompression code and image manipulation code to enable full access and control over the original image's pixels from within the client.

Cross Channel Imaging Chain—Implementation

After scaling and prior to compression and transmission, in accordance with an aspect of the present invention, proprietary server software, such as hosted and executed by system 121 or 170, encodes first images comprising greater than 8 BPP grayscale image data across 2 or more 8 bit-per-plane color channels supported by the client display device (e.g. system 128/174) to define second images. This allows proprietary client-side scripts (e.g. 250) to use the client device's native code 244 to decompress these second images (e.g. 260A, 260B, or 260C). When a second image is decompressed on the client without loss and the bits are distributed across more than one color channel, the client then completes a mapping to the appropriate digital display levels (DDLs) of the output device through either a linear or non-linear transformation to provide a reconstituted first image (e.g. 262A, 262B, or 262C).

The cross channel encoding operations are intended to take advantage of a color matrix filter if one exists on the display device, to leverage the display device's native code. In place of the color matrix filter, a linear transform on the particular color channels can be used, with a single channel gray output. This output is either copied to the color channels of a color display device, or used as-is. For a non-linear transform, the original gray value of a particular pixel may be reconstructed via a linear transform, and then apply a mathematical formula or lookup table to generate the correct output DDL.

This Method:

does not require the display device to support decompression of greater than 8 BPP per channel data;

does not require the display device to support an in-memory representation of greater than 8 BPP per channel data;

only requires that the display device supports 2 or more channels of data during decompression, and in the in-memory representation of the decompressed image data;

takes advantage of the device's image decompression and image manipulation routines to support fast client side performance and a greater user experience;

delivers greater than 8 BPP lossless grayscale image viewing and manipulation features without the need to install any software application on the host device.

When encoding the high BPP images into standard multi-channel image formats, one or more color channels may not contain image data per se. Other data, e.g. data associated with the images such as patient related data, health care provider notes etc, may be placed within these channels, but this is not required to load, display or manipulate the visual data.

An unsigned 16 BPP grayscale value $Y_{16}$ is encoded across multiple 8 BPP channels within a multi-channel image pixel representation. The representation used is dependent on the destination display device. For example, one pixel representation is ARGB, where A is an alpha, or transparency channel, and R, G, B are the red, green, and blue channels respectively.

Any one pixel of the image can be represented by a vector $[A_8, R_8, G_8, B_8]$. One possible cross-channel representation is achieved by $R_8=(Y_{16} \bmod 256)$, and $G_8=(Y_{16}>>8)$. Here ">>" is the right-shift operator, and "mod" is the integer modulo operator. $G_8$ now contains the high byte of $Y_{16}$ and $R_8$ contains the low byte of $Y_{16}$. $B_8$ and $A_8$ are unused. Often $B_8$ would be set to 0, and $A_8$ would be set to 255 (meaning an opaque pixel).

Figure 7A:
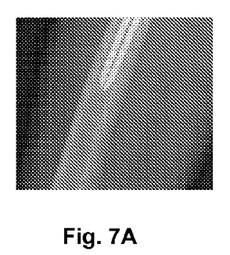
FIGS. 7A, 7B and 7C are a representative high depth image, cross-channel encoded image and decoded image in accordance with an embodiment.
Figure 7B:
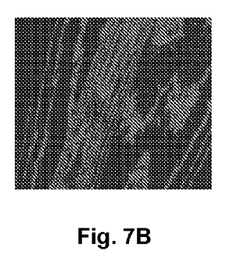
Figure 7C:
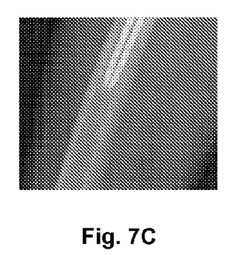

Example $Y_{16} = 62282 = 0xf34a$ $A_8 = 0xff$ $R_8 = (Y_{16} \bmod 256) = 0x4a$ $G_8 = (Y_{16} >> 8) = 0xf3$ $B_8 = 0x00$ FIGS. 7A-7C illustrate respectively, a 16 BPP DICOM CR image; that image cross-channel encoded for presentation in a 8 BPP or less capable image viewer (e.g. a web-browser); and that cross-channel encoded image as transformed and presented in a web-browser.

Once a client (e.g. system 128/174) receives the image, operations losslessly reverse undo the encoding by:

$Y_{16} = R_8 + (G_8 * 256)$

The 16 BPP gray values can then be put through any luminance-mapping transformations required for proper image display (i.e. linear and non-linear window and level adjustments). Often the final image display is a $Y_8$ (8 BPP gray) value. For a $Y_8$ grayscale display value, the ARGB value is:

$A_8 = 0xff$ $R_8 = Y_8$ $G_8 = Y_8$ $B_8 = Y_8$

The cross channel method was design specifically to take advantage of a color matrix filter transformation. If the destination display device supports color matrix filter transformations, the client is instructed through propriety scripts to apply an arbitrary linear transformation of the input 4-channel pixel-value $[A_8, R_8, G_8, B_8]$ into another 4-channel pixel value $[A_8, R_8, G_8, B_8]$.

When the desired transformation of a $Y_{16}$ image to the final displayable $Y_8$ form (which can be shown as a $[A_8, R_8, G_8, B_8]$ pixel) is linear, both the reconstruction of the $Y_{16}$ value from a cross-channel encoding, and the reduction to $Y_8$ form can be done in one step. Color matrix filter implementations can be leveraged since most support high bit depth intermediate results, usually floating point; this, combined with cross channel encoding, presents a powerful opportunity to leverage a significant amount of native code.

To achieve a mapping from $Y_{16}$ to $Y_8$ which includes the full range of input data, we would say that $Y_8 = (Y_{16} >> 8)$. If we have a cross-channel encoded image source, the color matrix filter transformation would be:

$$[A_8 \; R_8 \; G_8 \; B_8] = \begin{bmatrix} 1.00 & 0.00 & 0.00 & 0.00 & 0.00 \\ 0.00 & 0.00 & 1.00 & 0.00 & 0.00 \\ 0.00 & 0.00 & 1.00 & 0.00 & 0.00 \\ 0.00 & 0.00 & 1.00 & 0.00 & 0.00 \end{bmatrix} \begin{bmatrix} A_8 \\ R_8 \\ G_8 \\ B_8 \\ 1 \end{bmatrix}$$

The final $[A_8, R_8, G_8, B_8]$ values are derived from saturating the floating point values to a 0 to 255 integer range. In general, the transformation from $Y_{16}$ to $Y_8$ would be:

$Y_8 = \text{saturate8}(M \cdot Y_{16} + B)$

Here, saturate8 means to force all value $<=0$ to 0, and all values $>=255$ to 255. M and B are floating-point values, and the intermediate results would be calculated in floating point, or a high-accuracy fixed-point arithmetic. The final result is an 8-bit integer.

If the desired transformation was to only preserve the $Y_{16}$ values of 2048 to 6144 (a 12-bit range with an offset) in the $Y_8$ output, we would have $M=255.0/4095.0$, and $B=(-2048) \cdot M$. When the source is a cross-channel encoded image, the conversion matrix would be:

$$[A_8 \; R_8 \; G_8 \; B_8] = \begin{bmatrix} 1.00 & 0.00 & 0.00 & 0.00 & 0.00 \\ 0.00 & 0.06227 & 15.941 & 0.00 & -127.5 \\ 0.00 & 0.06227 & 15.941 & 0.00 & -127.5 \\ 0.00 & 0.06227 & 15.941 & 0.00 & -127.5 \end{bmatrix} \begin{bmatrix} A_8 \\ R_8 \\ G_8 \\ B_8 \\ 1 \end{bmatrix}$$

Figure 4:
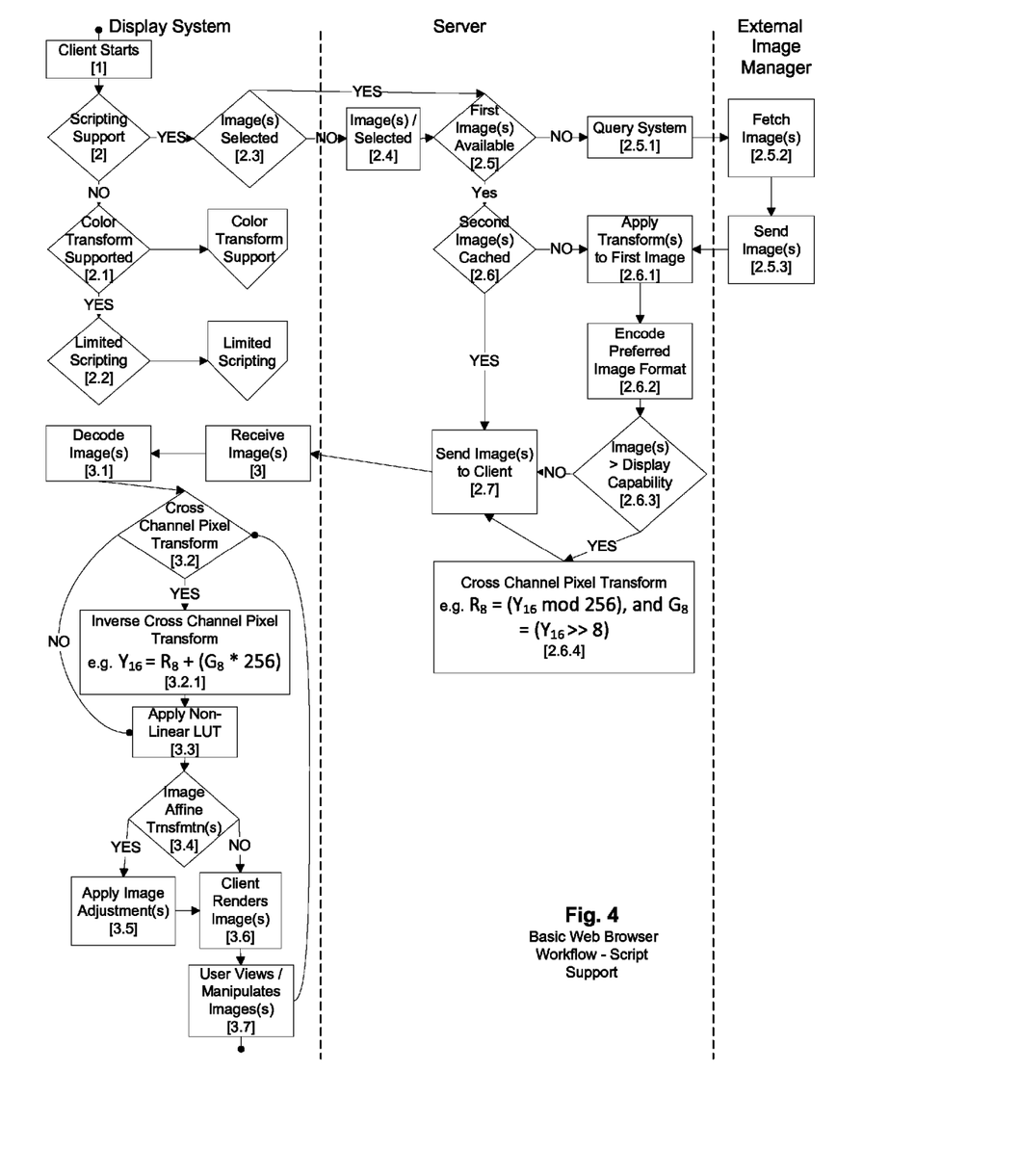
FIGS. 4-6 are flowcharts of operations for the network topology of FIG. 1 including server and client side component operations.
Figure 5:
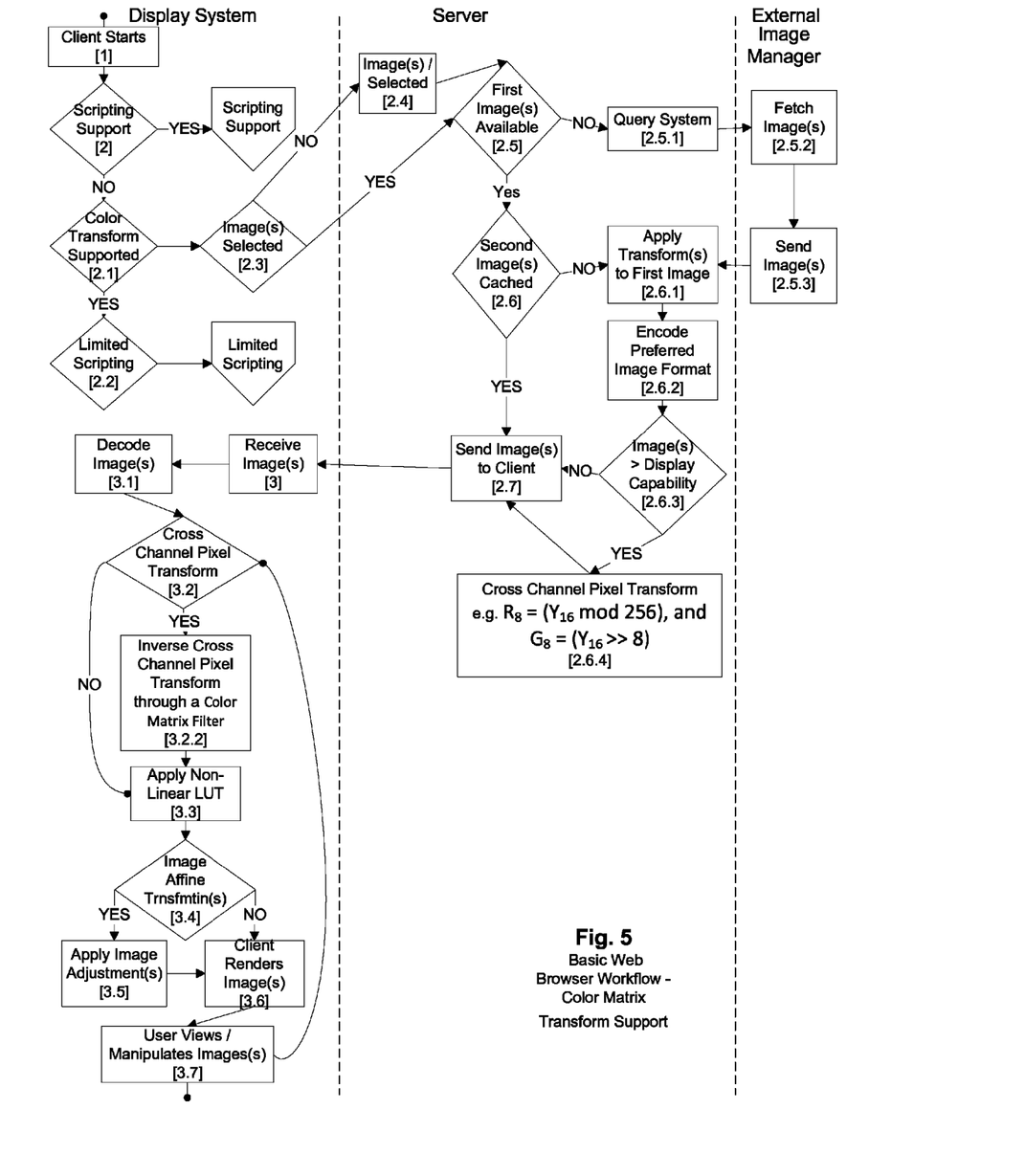
Figure 6:
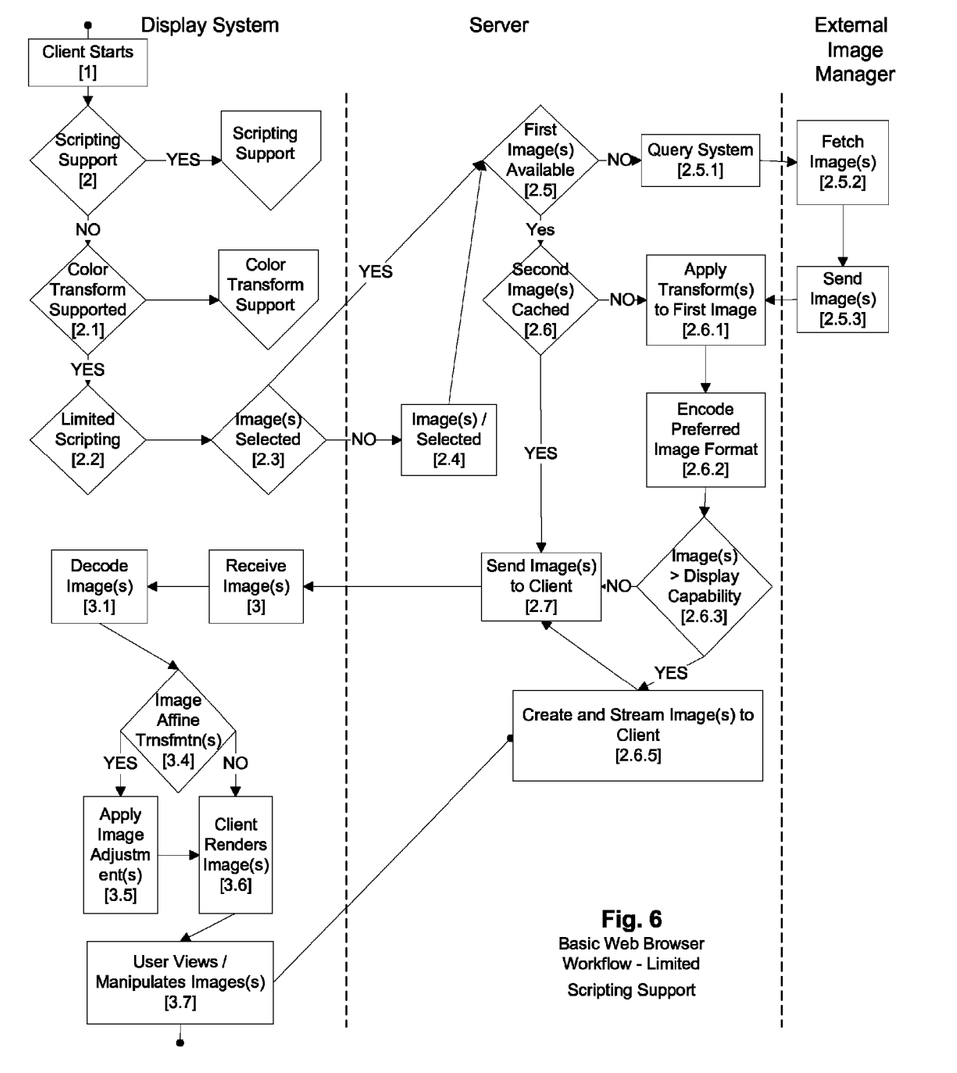

FIGS. 4 to 6 illustrate representative operations of a client display station or wireless device (e.g. system 128/174), an enterprise image system (e.g. system 121 or 170) and an external image management system (e.g. system 120). Details concerning authentication, communications, and other aspects are not germane to the teachings of the present matter.

With reference to FIG. 4., the client application (e.g. client image viewer script 250) may start by several methods including manually [1], automatically or based on a display system event. Typically, if the client image viewer script 250 is being hosted within a web-browser 240, a user may launch the client through a URL. Alternatively, another web-based application (not shown) may launch the client image viewer script 250 within its GUI and within the context of its content. A representative image viewer GUI 110A is illustrated in FIG. 3.

The client image viewer script 250, once started, determines the level of support and capabilities for scripting, image display and image transformations [2] [2.1] [2.2] available to it from system 127/174.

The client image viewer script 250 attempts to check if the system 127/174 supports an adequate scripting environment for image data transformations. For example, in the case of the web-browser 240, it checks to see if the host display device supports ECMA scripting (e.g. JavaScript). If an adequate scripting environment, such as ECMA scripting, is supported, the client will work with this scripting capability within its imaging chain [2] once the image(s), affine transformation(s) and image format(s) are selected either automatically, by the server 121/170 or by the user [2.3] [2.4].

If the client image viewer script 250 determines that the host display device does not support an adequate scripting environment for image data transformations it then attempts to determine if the host display device (e.g. system 128/174) supports image color matrix filter transformations. If the host display device supports image color matrix filter transformations (that is for example, comprises native code 244), the client image viewer script 250 will work with this capability within its imaging chain [2.1] once the image(s), affine transformation(s) and image format(s) are selected either automatically, by the server (121/170) or by the user [2.3] [2.4].

If the client image viewer script 250 determines, or fails to determine, if the host display device supports 1) an adequate scripting environment for image data transformations or 2) image color matrix filter transformations, the client image viewer script 250 will assume a limited capability host display device and work with this lack of capability within its imaging chain and leverage more of the server's capabilities

[2.2] once the image(s), affine transformation(s) and image format(s) are selected either automatically, by the server (121/170) or by the user [2.3] [2.4].

Once the image(s), affine transformation(s) and image format(s) are selected either automatically, by the server (121 or 170) or by the user [2.3] [2.4] the server (121 or 170) determines if the images(s) requested are available to the server (121 or 170) locally in their original format (A.K.A First Images) [2.5]. Though reference is made to the plural by way of First Images, a single image request is included.

If the First Images are not available to the server (121 or 170), the server (121 or 170) queries any available external image source systems [2.5.1] such as system 120. In the event the requested images are not available on any external image source systems 120 the server (121 or 170) returns an error to the client application 250 and the client image viewer script 250 presents an error message to the user (not depicted in the FIGS. 4, 5 and 6).

If the First Images are available on the external image source system 120 (e.g. one of images 123), the external image source system 120 fetches the required images [2.5.2] and the images are sent to the server 121 or 170 [2.5.3].

If the First images are available to the server 121 or 170 [2.5] the server 121 or 170 will determine if the Second Image(s) are also available to the server (i.e. if the image(s), affine transformation(s) and image format(s) were previously requested and are still cached the server, the server returns the Second Image(s) [2.6] [2.7].

If the Second Image(s) are not available [2.6], the server 121 or 170 starts the process of preparing the Second Images from the First Image(s), putting them through the imaging chain, first starting with extracting the image data from the First Image(s) and applying any affine transformations [2.6.1] selected either automatically, by the server 121 or 170 or by the user [2.3] [2.4].

After any affine transformations are applied to the image data, the image data is encode to the preferred image format [2.6.2] (i.e. multi-channel image format) selected either automatically, by the server 121 or 170 or by the user [2.3] [2.4].

If the image(s) encoded have a larger BPP than the host display device's display capability (e.g. the image(s) are 16 BPP grayscale and the host display device's display capability is no more than 8 BPP grayscale) [2.6.3] the server 121 or 170 further encodes the image data specifically based on the capabilities [2.6.4] determined in either steps [2], [2.1] and [2.3].

If the client image viewer script 250 determines the host display device supports an adequate scripting environment for image data transformations [2] (FIG. 4) or the client image viewer script 250 determines the host display device supports image color matrix filter transformations [2.1] (FIG. 5) the server encodes the grayscale image data [2.6.4] across the preferred color image format's color image channels (e.g. Cross Channel Pixel Transform e.g. R8=(Y16 mod 256), and G8=(Y16>>8)) and the image(s) (A.K.A Second Images) are sent to client image viewer script 250 [2.7].

If the client image viewer script 250 determines the host display device does not supports an adequate scripting environment for image data transformations and the client image viewer script 250 determines the host display device does not support image color matrix filter transformations [2.2] (FIG. 6) the server reduces the grayscale image data [2.6.5] to the BPP supported by the host display device and the image(s) (A.K.A Second Images) are sent to client image viewer script 250 [2.7].

Once the client image viewer script 250 receives the Second Image(s) [3] (e.g. 260A, 260B, 260C), the client image viewer script 250 decompresses the second image(s) [3.1]. In accordance with the present embodiment, native code 244 is utilized such as within or through operation of browser 240. As scripts may execute more slowly than native code for such operations, cross channel encoding is designed so that the Second Image data that is created is 1) able to maintain high BPP grayscale image data within low BPP color images and 2) is still able to be decompressed by the host display device's native decompression routines at native code execution speed rather than the via scripts at much slower speed.

Prior to displaying the second images to the User the system determines if the second image(s) (e.g. 260A, 260B, 260C) have been cross channel encoded [3.2]. If the second image(s) have been cross channel encoded they will not be in a proper displayable format for the user. The inverse of the cross channel transform must be applied to the second image(s) (i.e. to define reversed second images 262A, 262B, 262C) prior to displaying the images [3.2.2] [3.2.1] and prior to any client side affine transformations applied by the client image viewer script 250 [3.4] automatically or under user direction.

With reference to FIG. 4, if the client image viewer script 250 determined if the host display device supports an adequate scripting environment for image data transformations [2] the inverse cross channel pixel transform is applied [3.2.1] e.g. Y16=R8+(G8*256). Once the script applies the inverse cross channel pixel transform, the script applies a non linear LUT [3.3] to the image data as specified by the server.

With reference to FIG. 5, if the client image viewer script 250 determined if the host display device does not support an adequate scripting environment for image data transformations and the host display device supports image color matrix filter transformations [2.1] the inverse cross channel pixel transform is applied through a color matrix filter [3.2.2]. This same color matrix filter transformation also supports applying a linear window and level operation to the image data [3.3].

Other client side affine transformation(s) can be applied to the image(s) (262A, 262B, 262C) [3.4] [3.5] after the image data (260A, 260B, 260C) has had the inverse of the cross channel transform applied [3.2.2] [3.2.1] and the client renders the image(s) [3.6].

With reference to FIG. 4 or 5, if the client or the user manipulates the images(s) (for example, window and level operations) [3.7] for images that are cross channel encoded, the client uses the inverse of the cross channel transforms [3.2.2] [3.2.1] prior to displaying the manipulated image.

If the client or the user manipulates the images(s) for images that are not cross channel encoded, (e.g. FIG. 6) the client does not use the inverse of the cross channel transforms [3.2.2] [3.2.1] prior to displaying the manipulated image.

If the client or the user manipulates the images(s) for server reduced BPP images, the client requests new image(s) from the server [2.6.5].

Persons of ordinary skill in the art will appreciate that operations an enterprise image management, display and manipulation system (e.g. 121 or 170) as described in the embodiment illustrated in FIGS. 4-6 may be configured differently yet still provide cross-channel encoded images to client side display systems. For example, such a system need not locally store first images or cache previously generated second images. Such a system need not be configured to serve client side devices in response to their respective transformation and/or scripting capabilities.

Though described with reference to viewing images within a client side viewer for a web-browser, decoding and transformation operations may be configured within other types of document/image viewing applications. For example, within a portable document-type viewer and/or author.

Though illustrated as separate components with bright line distinctions, persons of ordinary skill in the art will appreciate that operations may be shared among various software components or overlapped and such component distinctions may be artificial. For example, in the above described embodiments, separate server side and client side operations are detailed. However, many operations thereof may be executed on a single system, particularly a system having only low depth image display capabilities to display high depth images. Such a system may then encode second images from available first high depth images. Such as system may communicate with a management system 120 or other server or data store (e.g. via a local network) and need not utilize a separate server (e.g. 121 or 170) to retrieve, encode and provide the images. A person of ordinary skill in the art will appreciate that though various computer systems whether server or end-user oriented systems, are described herein, many details of their general configuration as computing and display devices are omitted. It is understood that typically such systems comprise a processor and one or more memory device/storage devices coupled thereto for storing instructions and data for configuring the processor to perform certain functions when executing. Aspects of the teachings herein may be provided as computer systems or computer program products (e.g. comprising memory storing instructions and data for configuring the execution of a processor).

What is claimed is:

1. A method for encoding first images to second images comprising fewer Bits Per Pixel (BPP) per channel than said first images, said method comprising: dividing losslessly first BPP data of a channel from a first image among two or more channels of a multi-channel image format to define second BPP data of a second image for loading by a display system supporting said format, said first BPP data divided in accordance with a transformation for applying by the display system to display any portion of the first image within the display capability of the display system; and at least one of storing the second image or providing the second image for display by the display system.

2. The method of claim 1 wherein the first image has one or more a monochromatic channels and wherein the second images is a multi-channel color image.

3. The method of claim 1 wherein the first image comprises a magnetic resonance image (MRI), a computational tomography (CT) scan image, an x-ray image, a digital camera monochromatic image and a scanned image.

4. The method of claim 1 wherein the first BPP data for the channel comprises more than 8 BPP and wherein the second BPP data comprises 8 or fewer BPP for each channel.

5. The method of claim 1 wherein for each pixel of the first image's channel data comprises a full byte of data; and wherein the method comprises, for each respective pixel in the second image: encoding a first channel of the multi-channel image format of the second image with each low byte pixel of the first image; and encoding a second channel of the multi-channel image format of the second image with each high byte pixel of the first image.

6. The method of claim 1 wherein the transformation to be applied by the display system is a color matrix filter transformation natively supported by the display system.

7. The method of claim 6 wherein the color matrix filter transformation comprises floating point operations to support greater than 8 bit per pixel images.

8. The method of claim 1, wherein the transformation to be applied by the display system is a script to adjust the second BPP data to a Value Of Interest (VOI) through a pre-determined or assigned linear or non-linear Look Up Table (LUT) of values.

9. The method of claim 1 comprising adjusting the first image to apply image manipulations prior to said dividing.

10. The method of claim 1 comprising applying image manipulations specified by an external image acquisition device or other devices.

11. The method of claim 1 comprising embedding the second image in a portable file format prior to said at least one of storing the second image or providing the second image.

12. The method of claim 1 comprising receiving a request from said display system for providing said second image and providing said second image in response.

13. A system for encoding first images to second images comprising fewer Bits Per Pixel (BPP) per channel than said first images, the system comprising a processor and a memory coupled thereto, said memory storing instructions and data for configuring the processor to: divide losslessly first BPP data of a channel from a first image among two or more channels of a multi-channel image format to define second BPP data of a second image for loading by a display system supporting said format, said first BPP data divided in accordance with a transformation for applying by the display system to display any portion of the first image within the display capability of the display system; and at least one of store the second image or provide the second image for display by the display system.

14. A non-transitory computer program product for use on a computer, for encoding first images to second images comprising fewer Bits Per Pixel (BPP) per channel than said first images, the computer program product comprising computer readable computer program code which when executed by the computer: divides losslessly first BPP data of a channel from a first image among two or more channels of a multi-channel image format to define second BPP data of a second image for loading by a display system supporting said format, said first BPP data divided in accordance with a transformation for applying by the display system to display any portion of the first image within the display capability of the display system; and at least one of stores the second image or provides the second image for display by the display system.

15. A method for displaying high depth images in a low depth image capable display system, said method comprising: receiving a second image in a multi-channel image format supported by said display system and comprising data determined according to lossless cross-channel encoding from a first image having higher Bits Per Pixel (BPP) per channel than said second image; executing native code to decompress said second image in accordance with the supported multi-channel image format; and applying a transformation to said decompressed image in accordance with said cross-channel encoding to define a reconstituted first image to enable the display of any portion of the first image within the display capability of the display system.

16. The method of claim 15 wherein the transformation is a color matrix filter transformation natively supported by the display system.

17. The method of claim 16 wherein the color matrix filter transformation comprises floating point operations to support greater than 8 bit per pixel images.

18. The method of claim 15, wherein the transformation to be applied by the display system is a script to adjust the second BPP data to a Value Of Interest (VOI) through a pre-determined or assigned linear or non-linear Look Up Table (LUT) of values.

19. The method of claim 15 comprising adjusting the reconstituted first image to apply image manipulations for displaying.

20. The method of claim 19 comprising displaying said reconstituted first image.

21. The method of claim 20 comprising receiving user requests to manipulate the display of the reconstituted first image and performing said steps of transforming and adjusting in response to the request.

22. The method of claim 15 comprising requesting the second image from a image management system configured to define said second image by encoding said high depth images.

23. The method of claim 1 wherein the first image has one or more a monochromatic channels.

24. The method of claim 1 wherein the first image comprises a magnetic resonance image (MRI), a computational tomography (CT) scan image, an x-ray image, a digital camera monochromatic image and a scanned image.

25. A computer system for displaying high depth images in a low depth image capable display system, the computer system comprising a processor and a memory coupled thereto, said memory storing instructions and data for configuring the processor to: receive a second image in a multi-channel image format supported by said display system and comprising data determined according to lossless cross-channel encoding from a first image having higher Bits Per Pixel (BPP) per channel than said second image; execute native code to decompress said second image in accordance with the supported multi-channel image format; and apply a transformation to said decompressed image in accordance with said cross-channel encoding to define a reconstituted first image to enable the display of any portion of the first image within the display capability of the display system.

26. A non-transitory computer program product for use on a computer, for displaying high depth images in a low depth image capable display system, the computer program product comprising computer readable computer program code which when executed by the computer, the computer: receives a second image in a multi-channel image format supported by said display system and comprising data determined according to lossless cross-channel encoding from a first image having higher Bits Per Pixel (BPP) per channel than said second image; executes native code to decompress said second image in accordance with the supported multi-channel image format; and applies a transformation to said decompressed image in accordance with said cross-channel encoding to define a reconstituted first image to enable the display of any portion of the first image within the display capability of the display system.

* * * * *